United States Patent [19]

Gulick

[11] Patent Number: 5,362,949
[45] Date of Patent: Nov. 8, 1994

[54] PACKING HOUSE CONTROL SYSTEM

[76] Inventor: Gilbert G. Gulick, 701 Chancellar Dr., Lutz, Fla. 33549

[21] Appl. No.: 191,157

[22] Filed: Feb. 3, 1994

Related U.S. Application Data

[63] Continuation of Ser. No. 908,459, Jul. 6, 1992, abandoned.

[51] Int. Cl.[5] ............... G06F 15/24; G06F 15/00
[52] U.S. Cl. ..................... 235/385; 364/403
[58] Field of Search ............. 53/131.4; 235/375, 385; 364/403, 478

[56] References Cited

U.S. PATENT DOCUMENTS

| | | | |
|---|---|---|---|
| 4,073,122 | 2/1978 | Areson | 53/131.4 |
| 4,340,810 | 7/1982 | Glass | 235/385 X |
| 4,558,212 | 12/1985 | Hampson | 235/385 X |
| 4,578,572 | 3/1986 | Hice | 235/472 |
| 4,591,991 | 5/1986 | Sticht | 235/375 X |
| 4,610,359 | 9/1986 | Müller | 235/385 X |
| 4,651,150 | 3/1987 | Katz et al. | 235/385 X |
| 4,832,204 | 5/1989 | Handy et al. | 235/385 X |
| 5,038,283 | 8/1991 | Caveney | 235/385 X |
| 5,065,002 | 11/1991 | Tashiro et al. | 235/385 X |
| 5,161,929 | 11/1992 | Lichti, Sr. et al. | 414/331 |
| 5,189,863 | 3/1993 | Pozzi | 53/131.4 X |

*Primary Examiner*—Donald Hajec
*Assistant Examiner*—Jeffrey R. Filipek

[57] ABSTRACT

The disclosure is made in a fruit packing house, but the concept is applicable to any packing where multiple units are packed into containers and moved from a packing station to a shipping destination. The system employs computer techniques to identify the packer, container type, contents and other managerial information, by use of a single readable code label placed on a container.

2 Claims, 2 Drawing Sheets

PACKING HOUSE CONTROL SYSTEM

This is a continuation of Ser. No. 07/908,459, filed Jul. 6, 1992, now abandoned.

BACKGROUND OF THE INVENTION

1. Field of the Invention

Sorting, packing, identifying and shipping fungible goods.

Definitions

Primary Data Generating Device: a unit, located at each packing station, designed with a microprocessor, LCD window, and keypad. This unit receives data from the central computer, generates a unique code number, displays the data on the LCD window, and returns data entered via the keypad.

Secondary Data Generating Device: a unit as above, but with an optional code scanner added. This unit is preferably located after the packing station, and is used to produce supplemental information to the previously assigned unique code number (such as additional packing, inspection, for example).

Central Computer: a central control means including a program for storage, retrieving and processing information.

Code Signal Generator: circuitry 1 or producing ASCII code.

Machine Readable Code: but codes, encoded magnetic strips, optical code symbols, and their equivalents.

Packing Station: work or assembly location where goods are assembled or collected and placed in a container.

2. Background

Bar code, magnetic strips, optically read characters and the like, have a long history of highly successful application. Grocery store check out lines are a very visible example of the early use in adaptation of bar code reading. Credit cards have now adopted a magnetic strip encoding which accomplishes the same purpose. These are examples of machine readable symbols.

The discussion of the background of this invention will be directed to the most obvious art to which the present invention is related, namely systems for identifying units of items assembled at a packing station and transported to a second station wherein the container carrying the multiple number of units is monitored by means of a code symbol applied to the container as it leaves the packing station and is transported to a designated terminal. More specifically, the prior art fruit packing houses are the environment in which the present invention is being reduced to practice, and therefor, reference will be to a fruit box as the container. reduced to practice, and therefor, reference will be to a fruit box as the container.

At the time of this invention, the prior art practice has been to place a multiple number of bar code labels on the box container, usually on its top. Each bar code is a dedicated digital source of information. For example, it is common practice to place at least two labels on each box, the first of which is the packer person number which is used solely for the purpose of accounting and payroll.

The second label placed on the top of the box is for one specific bit of information such as the size or type of items in the container. The item code label source is located at the packing station and is a roll of labels that the packer keeps at that station. When a packer is required to move from one station to another, the roll of labels pertaining strictly to that packer is taken along to the new location. The item labels stay at the one station as long as there is packing of that size or type to do. If another size is to be packed at that particular station, then another roll of labels must be obtained that pertains to the new item.

Occasionally, a third or fourth code label is required. For example, master cartons are used to hold bags of fruit and a separate label is required to tell the weight and type of the individual bags within the box.

At the present stage of the art, if all of the information above is needed, and it often is, then three or four rolls of labels are needed. The chance for error by mispositioning of labels multiplies greatly when there is more than one label. Labels often wrinkle when being installed, and then cannot be read by a code scanner. Sometimes the operator places the label in the wrong orientation for reading and it cannot be read by a scanner.

The prior art system lacks the capability of identifying the number of boxes between packer station and a subsequent code reader. Therefor, human intervention is required to estimate the number of boxes on the conveyor if there is a specific number of containers required to fill an order, and then order the packer to stop when the required order is completed.

In summary, the prior art system begins with the packer placing items in a box. Then, as many as three or four code labels are attached to the top of the box and the packer records completion of the act on one or more counter means. The box is then placed on a conveyor belt and will go through a scanner. The scanner will scan the labels and then send the information to the ink jet printer if one is in use. The scanner will send that same information to a sortation system, if one is in use.

The major drawback of the above described prior art system is that the boxes are not identified until they get to the scanner. At that point, the packer of the box is identified. If a box is removed from the conveyor belt at any time before reaching the scanner, there is a discrepancy between the number of boxes the packer alleges to have been sent and the number that is received.

The prior art system is time consuming. The packer puts the fruit in the box, affixes up to four labels on the box, takes care of the personal counter and takes care of a house counter to let the supervisor know how much of a special order size has been packed. Then the box is put on the conveyor belt.

Another negative aspect of the prior art is that the printed bar code labels are very expensive. Elimination of numerous bar code labels to only one bar code label in an average packing house could amount to as much as $25,000.00 or more in savings on labels per year.

It is an object of the invention to reduce human error in packing, identifying and accounting for a packing house line.

It is another object of the invention to reduce the cost of a code control system in a packing house environment.

It is yet another object of the invention to provide a redundant information deposit withdrawal and control system working in harmony with a master control to avoid down time.

It is another object of this invention to combine a mix of information from code labels and predetermined information in memory means, to set up auxiliary functions such as an ink jet printer for fully identifying the contents of a box.

It is the primary object of this invention to accept and store all information concerning a packed box from multiple information sources, and when completed, such information is not confined to the bar code label.

SUMMARY OF THE INVENTION

A system that identifies the contents, packer, and other management information of a container by the use of a single machine readable code decal manually affixed to the container instead of a multiplicity of decals. This is accomplished by a data generating device at one or more packing stations which generate data that defines the meaning of the code decal. A central computer receives data from the data generating device and from an optional secondary data generating device located after the packing station. The machine readable code decal allows the initiation of a search of information in the central computer for control functions of processing equipment.

GENERIC CONCEPT

Figure 1:
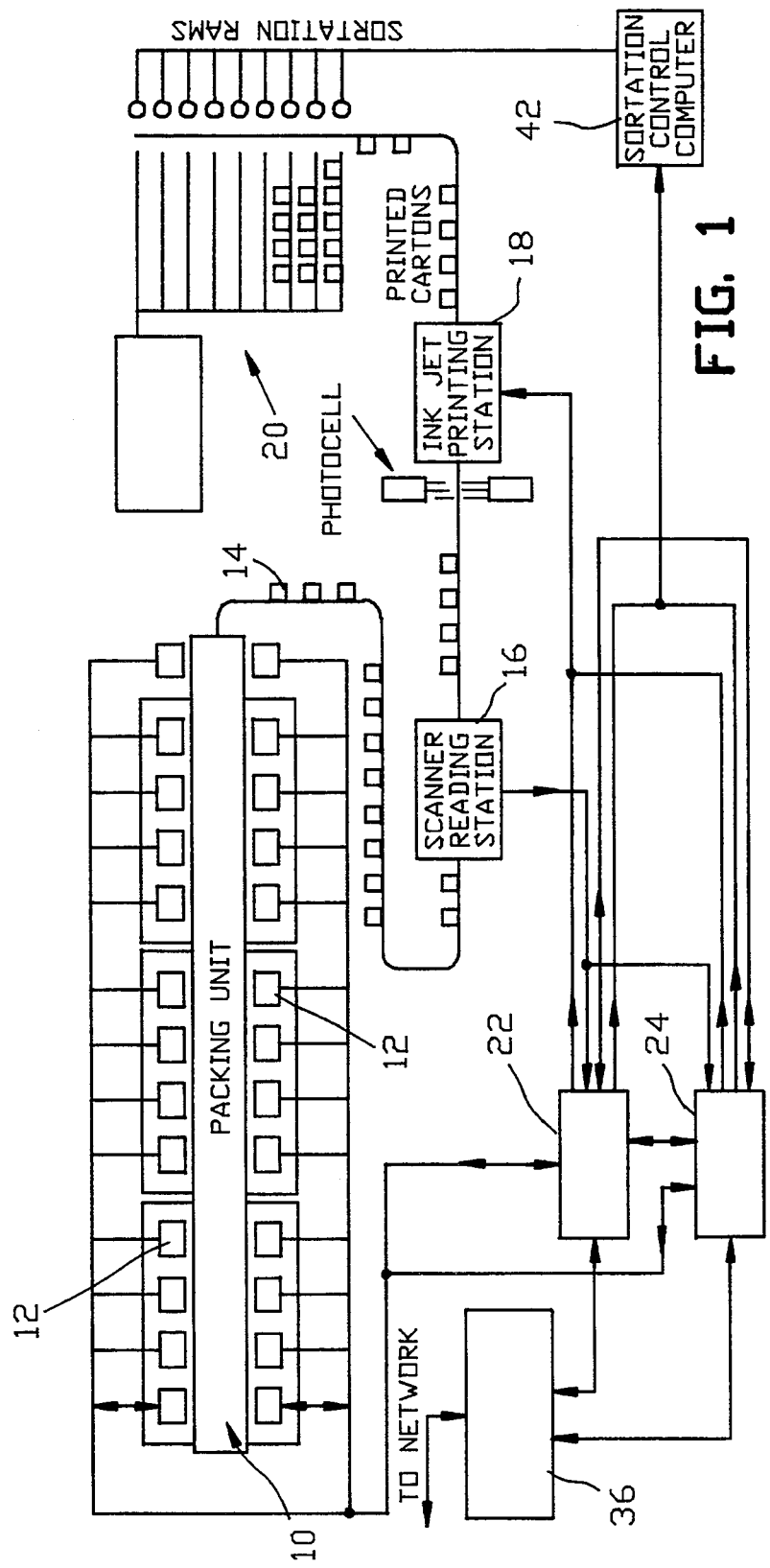
FIG. 1 is a schematic of a packing house packing line and programmed control thereof.

As a basic generic concept, this invention involves a packing facility for unitizing a plurality of pieces in one container.

A packing station, whether it be for fruit or manufactured items, is the assembly point where multiple numbers of units are placed in one box or container.

From the packing station, a conveyor carries the packaged assembly to a designated terminal. As described, the system's backbone is simply a packing station, a conveyor, and a terminal. The invention is involved in incorporating that backbone system into a novel control system.

One of the control components is the central control means which includes a program for storage, retrieving and processing information. In short, a computer.

At each packing station, there is a primary data generating device. A key pad is provided for use by the packing operator to generate ASCI code to the central control means. The data generating device informs the central control means of the packer number and what the packer is placing in a container. A secondary data generating device may be used after the primary, to provide supplemental information to the previously assigned unique code number. Separately from the employee at the packing station, an input means is provided whereby a supervisor can instruct the data generating device and/or the operator in various aspects of the packing process. The supervisor's information is placed in the central control means along with that generated by the data generating device.

Similar in appearance, but radically different in total context, a machine readable code label is placed on the top of the container before it leaves the packing station. According to this invention, that label has one dedicated function, and that is to identify the packer, container type, contents and other managerial information A code reader, such as a bar code scanner, is positioned between the packing station and the terminal, and that reader is programmed to transmit the content of the code label to the central control means. The central control means then instructs the function of the ink jet printer and sortation station.

Description of a preferred embodiment of the invention will now be illustrated by a specific example, including drawings, in order that those skilled in this technology may better understand the practice of the invention. The invention is, of course, not limited to this specific example but includes all the features and advantages described above.

DETAILED DESCRIPTION

Although equipment and programming are used in the present invention, these features are within the art and easily obtained and incorporated. The invention resides in the system displayed and explained herein.

Because the first reduction to practice is taking place in a citrus packing house, reference generally will be directed to citrus packing. The invention lends itself with minor adaptation such as addition or deletion of optional scanners, printers, sortation computers and the like, for packing individual goods in shipping containers and other assembly line type of product handling.

In the FIG. 1, a packing unit 10 consists of a plurality of packing stations 12. A primary data generating device classifies the contents of the container being packed at that station. The packer in station 12 affixes a unique marking device on the carton and presses a "packed" button 15, (See FIG. 2). The contents of the box are then represented by the unique marking device, such as a bar code label, and this information is stored in the main computer. Again, a secondary data generating device may be used for supplemental information.

A code reader, such as a bar code scanner 16, is placed in position to decipher coded labels placed on the containers as they pass by the scanner on the way to a terminus. The decoded unique information is directed to the main computer for determination of the contents of the box. The main computer relays the contents of the box to printing device 18 and a sortation computer 42.

In the illustrated embodiment of the invention, an ink jet printing station 18 is placed after the scanner 16 for printing information as to size, brand, or other such information on the box at station 18. Thereafter, the box is moved to a sortation station 20 where it and other boxes are directed onto loading chutes according to size, brand, or other necessary and desired information. This invention is in the embodiment of a control system to control an entire packing house program. The intent is to provide efficiency and to reduce human involvement, error and conflict.

To carry out these goals, information is deposited and withdrawn from a central computer in a manner that will provide this control efficiently.

A central computer 22 and a backup computer 24 consist of microprocessor, hardware and software.

At the beginning of the packing process, a unit foreman enters the data required to define the contents of the cartons being packed at each packing station into the central computer. Selected portions of this packing information are transfered from the central computer to the data generating device. This information for each individual packing station is displayed on a station data generating device LCD screen 38. See FIG. 2. This information may be changed during the packing process by the foreman or by the packer employee at the direction of the foreman. If the packer makes the change, the foreman can view the change on the central processing unit 22 CRT screen to insure that the packer made the change correctly.

Figure 2:
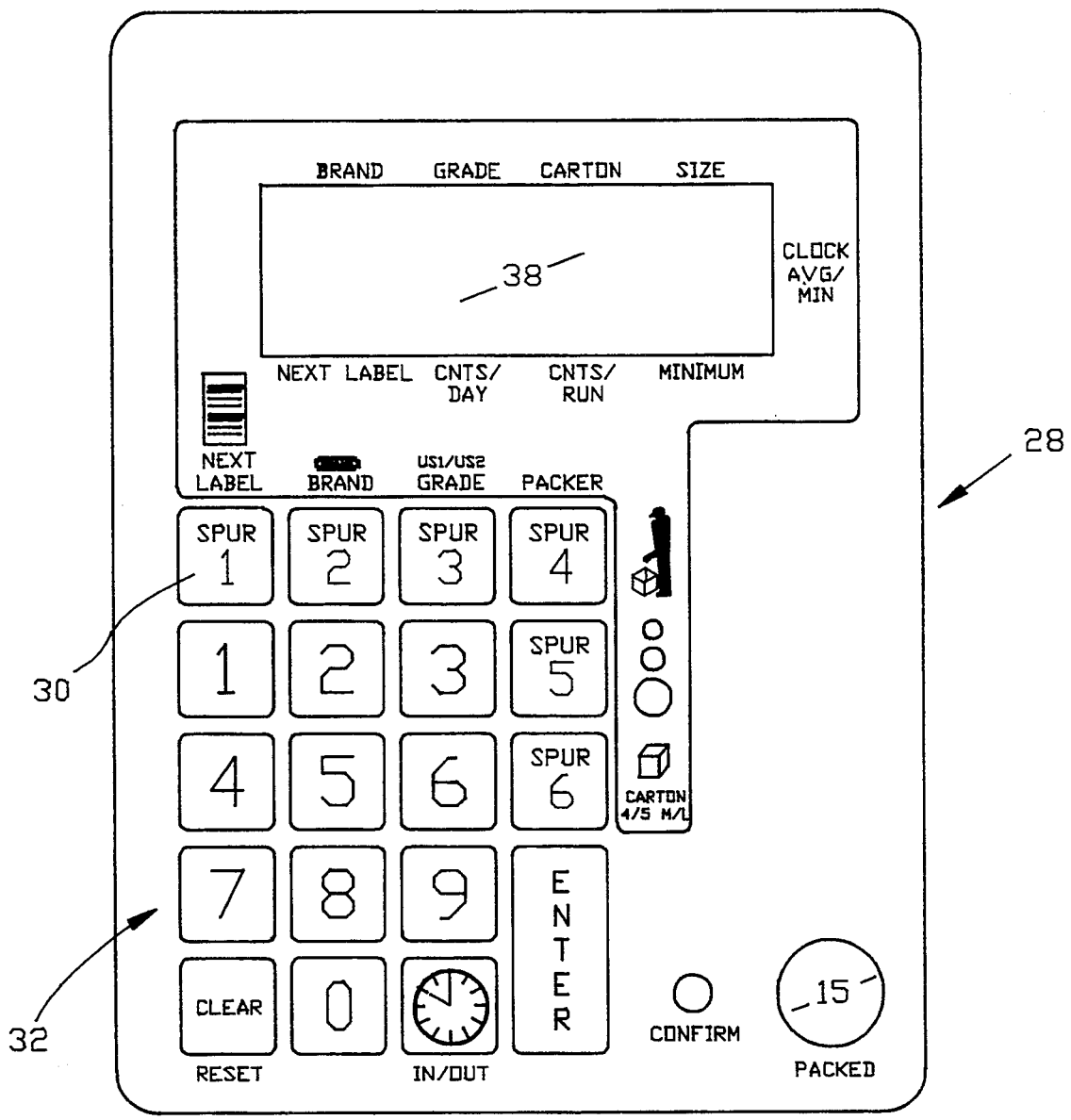
FIG. 2 is a mini-processor having a key pad for generation of code signals and a LCD window for display of information.

See FIG. 2. At each work packing station 12 is a microprocessor 28 which is a data generating device. Each data generating device has a series of mode keys 30 which are indicated by the drawings as spur 1 through spur 6. In order to aide those who have difficulty in reading, symbols are used to guide the packer in use of the data generating device 28. When a packer is assigned to a packing station in the packing unit, that packer presses spur 4 along side the symbol of a person placing objects in a box. Each station data generating device generates an ASCI code peculiar to that particular packing station. The code is sent to the computer 22 and initiates a response from the computer 22 directing the packer to key in the packer's assigned work number. The request will be displayed on the LCD screen 38. The worker uses a key pad 32, each with an ASCI code generating system, to inform the computer 22 and 24 of the packer's number. That number is then stored in memory in the central processor and can be read at any time for other purposes. No packing data is permanently stored in the station data generating device 28.

Before the packer begins shift work, a roll of machine readable labels is provided and the labels are dedicated to that particular packer for that particular work period. A roll of labels with this encoded information also contains a sequential number in order that the first box packed may contain the lowest, and the final box packed the highest number, so that visual mathematical confirmation can be made at the end of the work period as to the number of boxes packed. When the packer first activates spur 4, the LCD screen 38 will reveal the lowest number on the roll of labels and will update each time the packer presses packed button 15. The use of applied coded labels is similar to prior art practice, except that only one uniquely coded label is needed for each carton under this system to completely control the packing house operation in an improved and more cost effective manner.

The information put into the computer 22 from a foreman's station 36, together with the packer identification label placed each carton and the input from button 15, enables the system of this invention to completely control the packing process.

In the prior art, when up to three or four labels with various codes are placed on the carton, there is always the chance that the carton may be removed from the conveyor line prior to reaching the scanning device, thereby loosing all track of the packed carton.

In this invention, the packed boxes, bearing one coded label, pass from the packing unit 10 on a conveyor 14 to a scanner reading station 16. There is no way to prevent the removal of boxes from the conveyor prior to reaching the scanner 16, but the packer, having pressed button 15 with each box packed, will accurately record the number of boxes that should arrive at the scanner 16. If there is a discrepancy, the matter can be investigated at once and resolved between packer and management.

When the packer punches the packed button 15, it informs the computer 22 and its redundant computer 24 that a box has been packed and provides the coded information for the control computer 22. This information is now available for all future uses including carton printing, carton sortation and stacking, as well as sales and accounting information. It also monitors the number of boxes a particular person packs, the number of boxes per unit of time packed, and whether the packing rate per carton is generating enough earnings to guarantee minimum wage.

The packed box travels from the packing station to the scanning station by means of a conveyor system. Before the packed box arrives at the scanning and printing station, the packed box is conveyed onto a timing belt (not shown) which is moving at a rate of speed greater than the normal conveying system, thereby creating gaps between packed cartons. When the scanner sensor sensing a carton the scanner is turned on and all coded information on top of the carton is read. When the scanner senses the carton has passed, it turns off the scanner and transmits all coded information to the central computer 22. The central computer transmits information about the contents of the packed carton to the printing station. When the printing station senses the carton, the printing commences.

The central computer 22 also transmits information to the sortation computer 42 which determines the destination of the box in the sortation lineup.

In the prior art as known at this time, more than one code label must be placed on each box in order to guide the box through the system and provide information concerning the box. Accuracy depends upon careful placing of labels and even with four labels, the information is limited and is of limited usefulness for management reports and decision making.

The difference between the prior art and the present invention is greater than was expected when originally conceived. One outstanding example is ability to pack exactly the number of special order cartons required to fill an order. In the prior art, packers were requested to pack a specific number of cartons each to fill the special order. This required the use of a second counting device to enable the packers to pack the exact number of cartons required to fill the special order. The foreman did not know how many cartons had been packed for the special order until the cartons reached the scanner. If the packers packed the exact number of cartons required to fill the special order and the inspector or someone else did not remove any of the special order cartons from the conveyor prior to the time that the carton reached the scanner, then the number of cartons packed for the special order would equal the cartons specified in the special order.

However, in practice, the general outcome was to either have a few cartons too many or too few. The foreman then had to instruct the packers to pack additional cartons or the overage had to be removed from the sortation system. This practice was time-consuming and required a premium be placed on special orders.

With this invention, the foreman does not have to assign a specific number of cartons to a packer and therefor the second packing counter is not required. In fact, no foreman or packer intervention is required to fill special orders, thereby saving time and money.

Under this invention, special order quantities are entered into the central computing unit and when a carton meeting the specifications of the special order passes under the scanner the central computing unit assigns the carton to the special order and instructs the ink jet printer to print special order information on the carton.

When the requirements of the special order are met, the special order information is automatically removed from the central computing unit, therefor all special orders can now be filled electronically without human intervention, thereby increasing accuracy and decreasing effort, mistakes, and expense.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of control in a packing system including a manual packer person at a packing station for bringing together at least one item into one container, comprising:

providing a central computer having stored packing information and at least one data generating device;

transferring selected packing information from said central computer to said data generating device of an operation to be fulfilled;

actuating a signal from said data generating device to indicate a ready condition including the identification of the packer person at the packing station;

placing any needed additional and correctional data into said data generating device and transferring such additional and correctional data to the central computer to update the packing information in said central computer;

thereafter instructing the data generating device by said central computer with a starting label number;

verifying the number as the starting number in a series of code labels bearing a machine readable code indicating the sequential number of the label;

thereafter packing a container and placing the next label in the sequence on the container;

informing the central computer that a box with the single unique label bearing the designated number has been packed;

recording in the central computer a status information and sending the next label number to the data generating device, the primary reason for the central computer being to store the label numbers and their meanings;

whereby, any needed processing of a container after leaving the packing station is obtained by reading the one only code label, and seeking container information from the central computer pertaining to the container identified by that code label.

2. The packing control method of claim 1, wherein the series of events begins with providing the computer packing information in a program that includes physical data pertaining to the contents to be placed in a container, and transmitting selected packing information to the data generating device:

thereafter, the packing person actuates said data generating device which indicates the presence and identity of a worker at the packing station;

adjusting said packing information, if needed, and transmitting that information back to the central computer;

the packing and label placing steps being effected by the packer person then placing the item in a container and affixing one designated label to the container, then finally transmitting a signal to the central computer that a container as identified in memory is completed.

* * * * *